United States Patent [19]
Yasuda et al.

[11] Patent Number: 5,374,950
[45] Date of Patent: Dec. 20, 1994

[54] IMAGE FORMING APPARATUS TO PROVIDE MULTICOLOR IMAGES

[75] Inventors: Kazuo Yasuda; Kouichi Sawada; Yoshiyuki Ichihara, all of Hachioji, Japan

[73] Assignee: Konica Corporation, Tokyo, Japan

[21] Appl. No.: 142,079

[22] Filed: Oct. 28, 1993

[30] Foreign Application Priority Data

Nov. 18, 1992 [JP] Japan .................. 4-308554

[51] Int. Cl.⁵ .............................. H04N 1/21
[52] U.S. Cl. .................. 346/160; 355/208; 355/214
[58] Field of Search ............. 346/108, 160, 107 R, 346/76 L, 1.1; 355/200, 202, 208, 214

[56] References Cited

U.S. PATENT DOCUMENTS 5,266,997 11/1993 Nakane et al. ............. 355/208

FOREIGN PATENT DOCUMENTS 61-199380 9/1986 Japan .
63-65458 3/1988 Japan .

Primary Examiner—Mark J. Reinhart
Attorney, Agent, or Firm—Finnegan, Henderson, Farabow, Garrett & Dunner

[57] ABSTRACT

In a color toner image forming apparatus equipped with a scanning device to scan a photoreceptor with a light beam which is modulated on the basis of image density represented by image signals so that a latent image is formed on the photoreceptor; there is provided a control device to control the color toner image forming apparatus so that plural color toner images are superimposed on the photorecetor. The control device includes a start position control circuit to control a scanning start position of the scanning device so that the scanning start position is shifted for each of the plural color component images.

5 Claims, 10 Drawing Sheets

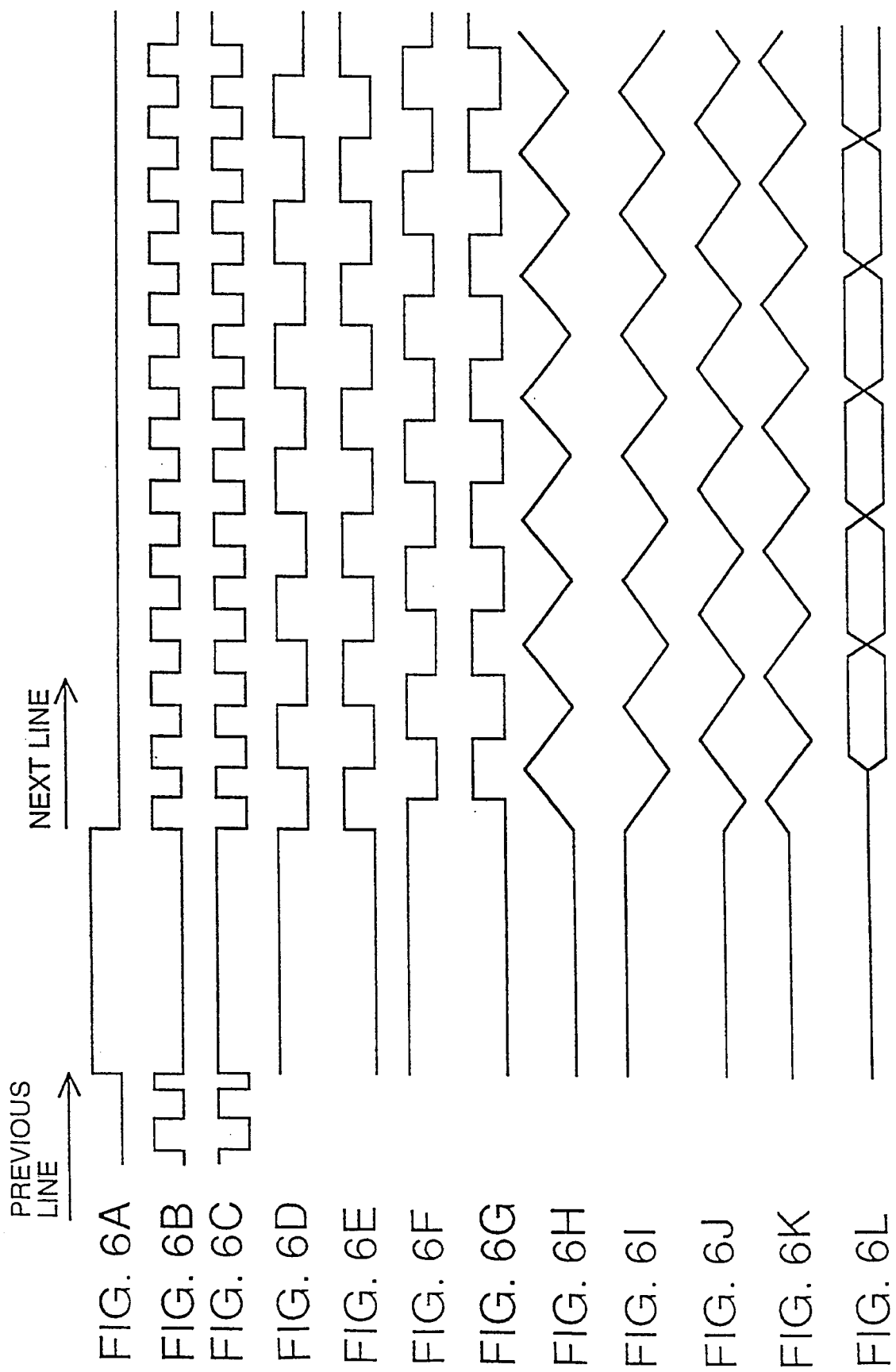

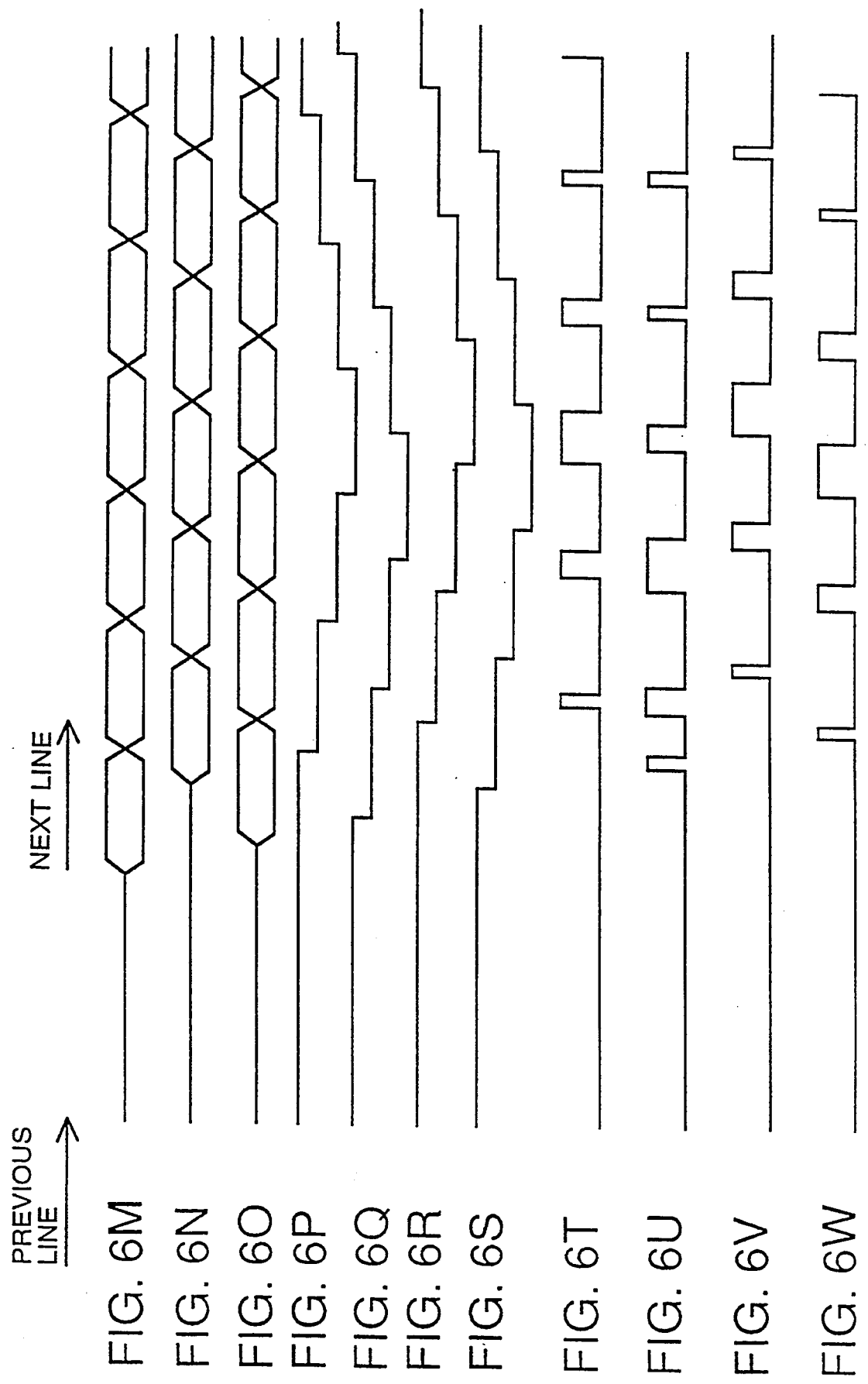

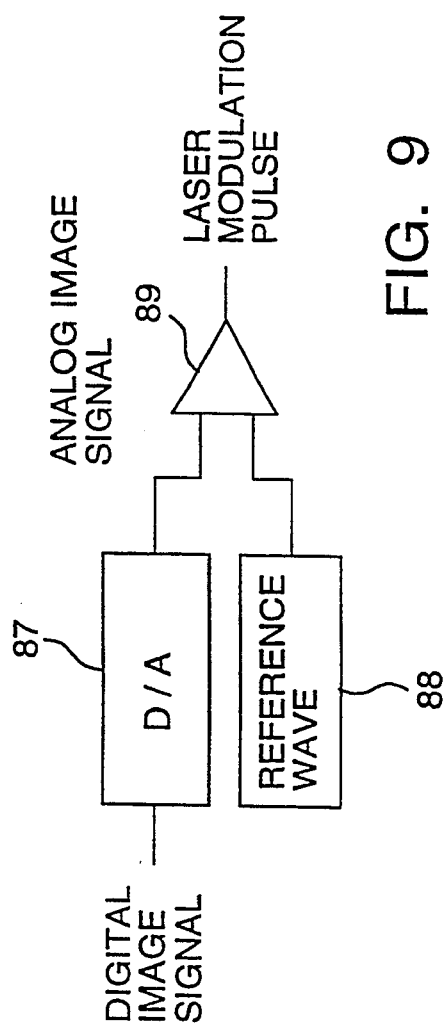
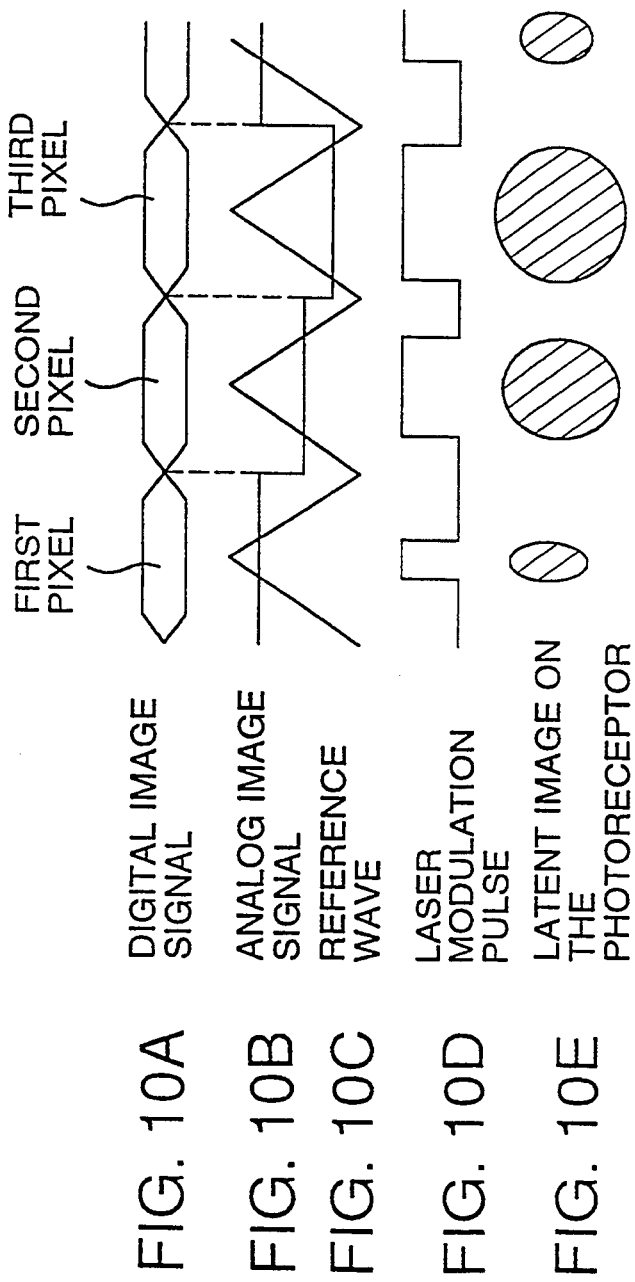

# IMAGE FORMING APPARATUS TO PROVIDE MULTICOLOR IMAGES

BACKGROUND OF THE INVENTION

The present invention relates to a technique to improve developing properties of different color components in an image forming apparatus (electrophotographic apparatus), such as a color laser printer by which multicolor images can be provided, and more particularly relates to a technique to improve developing properties in a highlight (low density) region.

With reference to FIGS. 8 to 11, an outline of the process from development to print in a color laser printer will be described as follows. In FIG. 8, the surface of a photoreceptor drum 82 is electrically charged by a charging unit 81. Then, the surface of the photoreceptor drum 82 is raster-scanned by laser beams modulated by an image signal corresponding to a yellow toner image, so that a latent image of yellow is formed. After that, the latent image is developed by a developing unit 83 with yellow toner. In this case, the image signal is supplied by a color scanner not shown. (In the case of a copier, the color scanner is integrally assembled to the apparatus.) Alternatively the image signal is supplied by a computer in the form of data on one screen for each toner color. Then, the same operation as that described above is repeated for each of magenta, cyan and black toners, so that four color toner images can be formed on the surface of the photoreceptor drum 82. After that, the four color toner images are concurrently transferred onto a transfer sheet by a transfer pole 84. Then the transfer sheet is separated from the photoreceptor drum 82 surface by the action of a separation pole 85, and the transferred toner image is fixed by a fixing unit 86. In this way, a full color image can be provided.

In this case, the image signal is a multiple-valued signal (8 bits=256 gradations). Therefore, dot formation must be conducted on the photoreceptor drum 82 in a multiple-valued manner. For that reason, a time modulation system of laser beams has been conventionally known, in which pulse width modulation is performed.

The time modulation system of laser beams will be described as follows:

As shown in FIG. 9, an inputted multiple-valued digital image signal is converted into an analog image signal by a D/A converter 87. The converted signal is compared by a comparator 89 with a reference signal (in this case, a triangular wave) generated by a reference signal generation circuit 88. Thus a time modulation pulse is provided. A laser unit is controlled to be turned on and off by the provided time modulation pulse. As a result of the foregoing, a beam scanning operation of limited size corresponding to the lighting time is carried out as illustrated in FIGS. 10A through 10E, and a multiple-valued latent image is formed from dots of different sizes. When the latent image is developed by toner, multiple-valued density recording is performed.

In this connection, the conventional latent image which is composed of dots of each color is controlled in a printing process so that the dots are completely superimposed. Therefore, as shown in FIG. 11, concerning the color in a highlight (low density) region, latent images formed through time modulation conducted in a short period of time are superimposed on a toner image. Therefore, it is difficult to accurately control the deposition of toner to be superimposed. As a result, unevenness tends to occur on a color image in the process of color reproduction in the important highlight region.

SUMMARY OF THE INVENTION

In view of the aforesaid problems, the present invention has been achieved. It is an object of the present invention to improve color reproduction properties of a multiple color image forming apparatus by improving the toner depositing condition in a highlight region.

In order to accomplish the aforesaid object, an image forming apparatus of the present invention is constructed in the following manner. In the image forming apparatus, a latent image is formed when scanning is conducted in accordance with an image signal for each color subjected to area-modulation in accordance with density on an image carrier, and the formed latent image is developed with toner for each color component in each developing process so that a multiple color visual image is formed on the image carrier. In the image forming apparatus, a scanning start position control means is provided, which shifts a scanning start position of the image signal for each color component in a region, the density of which is not less than a predetermined value, so that an amount of shift is provided in a range in which plural color component images are overlapped.

The aforesaid scanning start position control means may be constructed so that the scanning start position of the image signal for each color component can be shifted in a range from 1/6 to ½ pixel.

Further, the aforesaid scanning start position control means may be constructed so that the scanning start position of the image signal for each color component can be shifted at least in one direction of the primary and auxiliary scanning directions.

According to the construction described above, the scanning start position of the image signal for each color is shifted by the scanning start position control means. Therefore, the area in which the toner images are not overlapped can be increased in the low density region. Due to the foregoing, toner images of color components developed second and after that, can be stably deposited on the image carrier, so that the deposition amount of toner of each color component can be accurately controlled. Further, the slippage of each toner image is satisfactorily small, and can not be recognized by the human eye. In this way, color reproduction properties can be improved. Furthermore, as the density is increased, the overlap of the toner image is increased, so that the color reproduction properties in a high density region can be positively ensured.

When the scanning start position of the image signal for each color is shifted in a range from 1/6 to ½ pixel, the color reproduction properties in a low density region and those in a high density region can be well balanced. As a result, colors can be excellently reproduced without deteriorating the resolving power.

BRIEF DESCRIPTION OF THE DRAWINGS

In the detailed description of the preferred embodiments of the invention presented below, reference is made to the accompanying drawings in which:

FIGS. 6A through 6W are time charts showing the condition of a signal inputted into and outputted from each circuit of the color laser printer.

FIG. 9 is a circuit diagram showing an arrangement of the pulse width modulation circuit of the conventional color laser printer;

FIGS. 10A through 10E are time charts showing the condition of a signal inputted into and outputted from each portion of the conventional color laser printer.

DETAILED DESCRIPTION OF THE PREFERRED EMBODIMENT

With reference to the accompanying drawings, examples of the present invention will be explained as follows.

Figure 1:
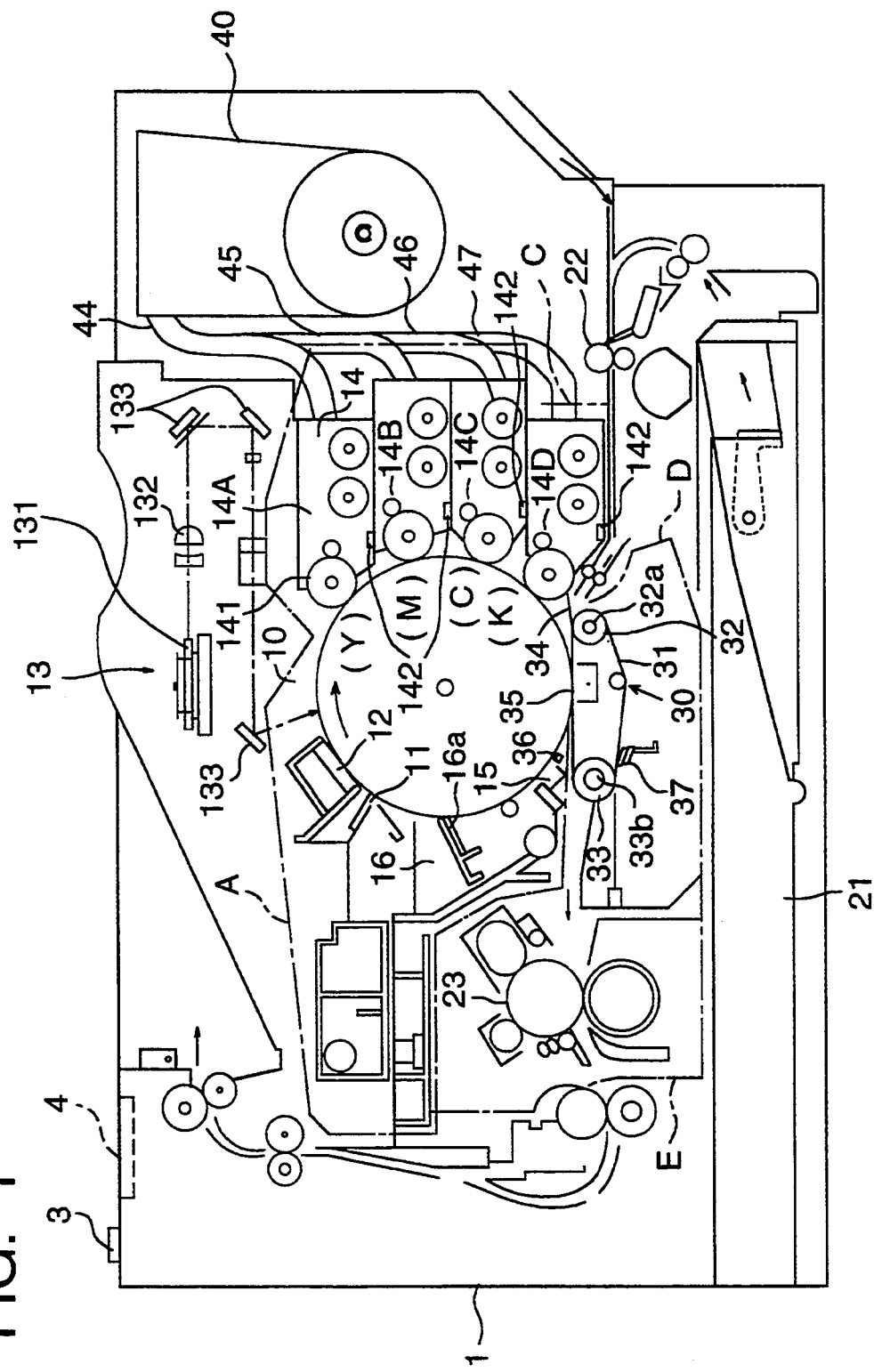
FIG. 1 is a sectional view showing an overall arrangement of the color laser printer relating to the first example of the present invention.

FIG. 1 is a sectional view showing an overall arrangement of the color laser printer relating to the first example of the present invention. The arrangement and a series of operations will be briefly described as follows. The surface of a photoreceptor drum 10, which is an image carrier, is coated with an OPC photosensitive layer. The photoreceptor drum 10 is rotated in one direction, that is, the photoreceptor drum 10 is rotated clockwise in the case illustrated in the drawing. While the photoreceptor 10 is being rotated, it is neutralized by a neutralizer 11 so that the electrical charge given in the previous printing process is removed. A circumferential surface of the photoreceptor drum 10 is uniformly charged by a charging unit 12 so as to be ready for the next printing operation.

After the circumferential surface of the photoreceptor drum 10 has been uniformly charged, image exposure is conducted by an image exposure means 13 in accordance with an image signal. In the image exposure means 13, rotary scanning is conducted by the laser beams emitted from a laser beam source described later by the action of a polygonal mirror 131. Then, the laser beams pass through an $f\theta$ lens 132, and the optical path of each laser beam is bent by a reflection mirror 133. After that the laser beams are projected onto a circumferential surface of the photoreceptor drum 10 so that a latent image can be formed on the photoreceptor drum surface.

Around the photoreceptor drum 10 are provided developing units 14 in which developers containing toners of yellow (Y), magenta (M), cyan (C) and black (K), and magnetic carrier are respectively charged. First, development of the first color is conducted by a development sleeve 141 that is rotated while it is holding developer of the first color. A developer layer, the thickness of which is regulated to be a predetermined value by a layer forming rod, is formed on the development sleeve 141 and conveyed to a development region. Between the photoreceptor drum 10 and the development sleeve 141, is impressed a bias voltage in which AC bias $V_{AC}$ and DC bias $V_{DC}$ are superimposed. In this case, DC bias voltage $V_{DC}$ is determined so that the inequality of $V_H > V_{DC} > V_L$ can be satisfied, wherein a potential (ground potential) of an exposed portion of the photoreceptor drum 10 is $V_L$, and a surface potential of the charged photoreceptor layer on the photoreceptor drum 10 except for the exposed portion is $V_H$. When DC bias voltage $V_{DC}$ determined in the aforesaid manner is impressed, the toner is triggered to separate from the carrier. The separated toner does not deposit on a portion, the potential of which is $V_H$, wherein $V_H$ is higher than $V_{DC}$, but the separated toner deposits on an exposed portion, the potential of which is $V_L$, wherein $V_L$ is lower than $V_{DC}$. When the toner deposits in the aforesaid manner, the latent image is developed and visualized.

After the developing operation of the first color has been completed in the manner described above, the second color (for example, magenta) image formation is started. That is, the photoreceptor drum 10 is uniformly charged, and a latent image is formed by the image exposure means 13 in accordance with image data of the second color. An image of the third color (cyan) and that of the fourth color (black) are formed in the same manner. Accordingly, images of four colors are formed on the circumferential surface of the photoreceptor drum 10.

On the other hand, a recording paper P is fed from a paper feed cassette 21 by a paper feed mechanism 22. Then, the recording paper P is fed by a transfer belt unit 30 having a transfer belt 31, to a nip portion (transfer region) 35 formed between the photoreceptor drum 10 and a transfer belt 31. In the transfer region, the multiple color image formed on the circumferential surface of the photoreceptor drum 10 entirely transferred onto the recording paper P. In this case, a high voltage is impressed upon a shaft 32a of a holding roller 32 provided on an upstream side of the transfer belt 31. A conductive brush 34 attached to the shaft 32a being opposed to the transfer belt 31, is grounded, and the conveyed recording paper P enters a space formed between the brush 34 and the transfer belt 31. Then an electrical charge is injected onto the recording paper P by the brush 34. While the recording paper P is attracted to the transfer belt 31 by the action of the injected electrical charge, the recording paper P enters the transfer region. The recording paper P that has been separated from the photoreceptor drum 10 is separated from the transfer belt 31 by being neutralized while the shaft 33b of the holding roller 33 on the downstream side of the transfer belt 31 is used as an opposed electrode. In this case, the deposited toner on the transfer belt 31 is removed by a cleaning blade 37. In this connection, while a multiple color image is being formed, the transfer belt 31 is separated from the surface of the photoreceptor drum 10 by being rotated around a shaft 33b of the holding roller 33 on the downstream side.

After the recording paper P has been separated from the transfer belt unit 30, it is conveyed to a fixing unit 23 composed of two fixing rollers, wherein at least one of the rollers is provided with a heater assembled inside the roller. When the recording paper P is heated and pressed by the fixing rollers, the deposited toner is fused and fixed on the recording paper P. After that, the recording paper is conveyed outside of the apparatus.

The residual toner on the circumferential surface of the photoreceptor drum 10 is neutralized by the neutralizer 15, and arrives at the cleaning unit 16. Then the residual toner is scraped off by a cleaning blade 16a so that it drops into the cleaning unit 16. Then the toner is conveyed by a screw conveyer and recovered by a recovery box. After the photoreceptor drum 10 has been cleaned by the cleaning unit 16, it is neutralized by the neutralizer 11, and uniformly charged by the charging unit 12. Then the photoreceptor drum 10 enters the next image formation cycle. When the recording paper P is not separated from the transfer belt 31, it is wound around the photoreceptor drum 10 and enters the neutralizer 15. In this case, there is a possibility that the cleaning blade 16a and the electrode wire are damaged. In order to prevent the aforesaid problems, a JAM sensor 36 to detect the wound recording paper P is provided close to the neutralizer 15.

Next, with reference to FIG. 2, the construction and operation of latent image formation relating to the present invention will be explained in detail as follows.

An optical signal that has been modulated by an image signal is emitted from a semiconductor laser 51. Then the optical signal passes through a collimator lens 52, so that the optical signal can be collimated and formed into a parallel beam of a predetermined diameter. Then the parallel beam passes through a cylindrical lens 53, and a rotary scanning operation is conducted by the action of a rotating polygonal mirror 131. After that, the beam passes through an Fθ lens (image formation and scanning lens) 132 and a reflection mirror 133. In this way, an image is formed and scanned on the surface of the photoreceptor drum 10.

In this case, the function of the cylindrical lens 53 is described as follows:

The cylindrical lens 53 is used in cooperation with the Fθ lens 132, and prevents the occurrence of slippage of an image forming position on the photoreceptor drum 10 in the auxiliary direction, wherein the slippage is caused by an error of the polygonal mirror surface in an axial direction of the polygonal mirror motor shaft. The aforesaid technique to correct the tilting angle of the polygonal mirror surface is well known.

The Fθ lens 132 has a function in which the beam, the diameter of which has been made to be a predetermined value by the action of the collimator lens 52, is made to be a beam of which the diameter is minute, so that an image can be formed by the beam of the minute diameter. For example, in the case of recording density of 400 dpi (25.4 mm/400=63.5μ pitch), the diameter of the beam is made to be 60 to 70μ on the surface of the photoreceptor drum 10. In this system in which gradation modulation is conducted on the beam in accordance with the pulse width, the minute beam is formed into an ellipse, wherein the diameter of the ellipse in the primary scanning direction is 50 to 60μ, and the diameter of the ellipse in the auxiliary scanning direction is 60 to 70μ. When the minute beam dimensions are determined in this way, gradation control properties can be improved, and unevenness of potential caused by the overlapped beam in the auxiliary direction can be reduced. The Fθ lens 132 has not only the function of image formation in the form of a minute beam, but also the Fθ lens includes a function by which a constant angular velocity motion of the beam conducted by the polygonal mirror 131 is converted into a constant linear velocity motion. The image formation performance in the scanning direction is described as follows. The image forming position X mm is determined by a product of the focal distance F mm of the lens and the incident angle θ of the beam. Furthermore, concerning the auxiliary scanning direction of the photoreceptor drum 10, the Fθ lens 132 has a function by which the tilting angle can be corrected in cooperation with the cylindrical lens 53.

The polygonal mirror 131 is rotated by a polygonal mirror motor driver 61 at a predetermined speed in a direction of an arrow illustrated in the drawing. Usually, the motor driver 61 starts rotating when the apparatus is energized by a power source. When the rotational speed of the polygonal mirror motor 54 is R rpm and the number of surfaces of the polygonal mirror 131 is N, the number of scanning lines is (R·N/60) per second.

The start position for writing of the scanning line projected on the photoreceptor drum 10 in the primary scanning direction deviates according to the grade of stability of the rotation of the polygonal mirror 131 and also according to the error of the division angle of each mirror surface. (In the case where the polygonal mirror is divided into N surfaces, the division angle is 360/N degree.) Therefore, the fore end of a scanning line is detected by a fore end detection sensor 55 to detect a synchronization signal of the fore end of the laser beam. This detection signal is received by a control unit 62, and a basic clock signal is generated in synchronization with the detection signal. This basic clock signal is a clock, the speed of which is twice as high as that of the image signal.

In this case, the reference characters are defined as follows.

D: Dot density (dpi)

$\pi$: Circular constant

R: rotational speed of the polygonal mirror motor (rpm)

F: focal distance of Fθ lens (mm)

A basic clock signal, the clock frequency of which is 8·R·F·D·$\pi$/(25.4·60) Hz, is synchronously generated in the control unit 62 for each line, and sent to a primary scanning position control circuit 63. This primary scanning position control circuit 63 constitutes the scanning start position control means of the present invention.

In this system, the photoreceptor drum 10 is rotated by a stepping motor 65 through a speed reducer 64. The stepping motor 65 is driven by a stepping motor driver 66. The stepping motor driver 66 is constructed in such a manner that the stepping motor driver 66 drives the stepping motor 65 in accordance with a pulse signal sent from the control unit 62. Various types of stepping motors can be applied for the stepping motor 65, however, a 5-phase stepping motor capable of accurately controlling rotational angles is provided as an example here. When the stepping motor driver 66 is constructed in such a manner that the four to five phases of the stepping motor are excited so as to drive a half step, stepping rotation can be conducted by an angle of 0.36° of the motor shaft per one pulse inputted into the stepping motor driver 66.

When the control unit 62 sends the aforesaid fore end synchronization detection signal so as to be used as a motor drive pulse, the motor is rotated by an angle of 0.36° each time the fore end of one line comes around. That is, according to the aforesaid construction, the motor is rotated by one revolution for every 1000 lines. When the rotational angle of one step per one pulse of the photoreceptor drum 10 and the stepping motor is defined as P and the reduction ratio of the speed reducer 63 is defined as G, the number of lines recorded during one revolution of the photoreceptor drum 10 is expressed as follows.

$$360/(P \cdot G)$$

In this system in which images of Y, M, C and BK are superimposed on the photoreceptor drum 10, in order to prevent the slippage of lines caused when the photoreceptor drum 10 is rotated, it is important to determine the number of lines recorded during one revolution of the photoreceptor drum 10, to be an integer.

When the dot density is defined as D dpi, the circumferential length L of the photoreceptor drum 10 is expressed as follows.

$$(360 \cdot 25.4)/P \cdot G \cdot D \text{ mm}$$

In order to superimpose the toner images of Y, M, C and BK on the photoreceptor drum 10, it is necessary that L is larger than the size of recording papers to be used. (For example, when recording papers of A3 size are longitudinally used, L must be longer than 410 mm.)

One color image is reproduced by toners of Y, M, C and BK. For the purpose of switching the image signal for each color, the control unit 62 outputs a color switching signal of 2 bits. For example, in the first image recording cycle of the photoreceptor drum 10, image signals corresponding to Y are recorded. At that time, a signal 00 is outputted. In the cycle of M of the second color, 01 is outputted. In the cycle of C of the third color, 10 is outputted. In the cycle of BK of the fourth color, 11 is outputted. The control unit 62 counts the number of motor drive pulses using the fore end synchronization signals that are equivalent to the number of lines to be recorded on the photoreceptor drum 10. Therefore, when the signals are switched every 1000 pulses in the aforesaid example, the lines of all colors can be accurately superimposed and recorded. Of course, this color switching signal is sent to an image signal transmitting means not shown (such as a color scanner and a print controller) that supplies multiple-valued image signals, so that the color signal is controlled to synchronize with the recording position control.

Figure 3:
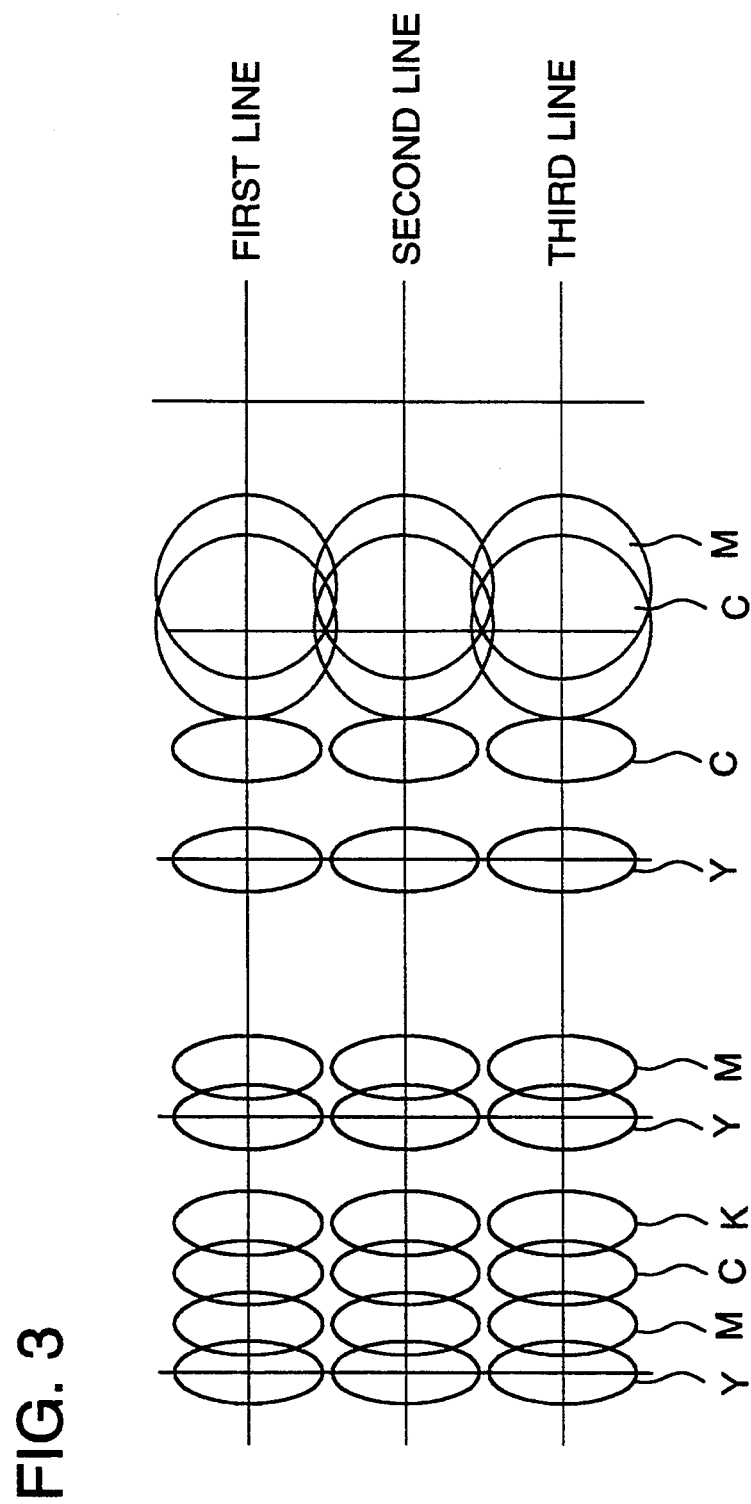
FIG. 3 is a time chart showing the condition of a toner image of each color component in the color laser printer.

As explained above, the lines can be superimposed in the auxiliary scanning direction as shown in FIG. 3. Next, a construction will be explained, in which the dot positions are controlled in the primary scanning direction using the aforesaid basic clocks.

With reference to FIGS. 4, 5 and 6A through 6W, the construction will be explained as follows.

Figure 2:
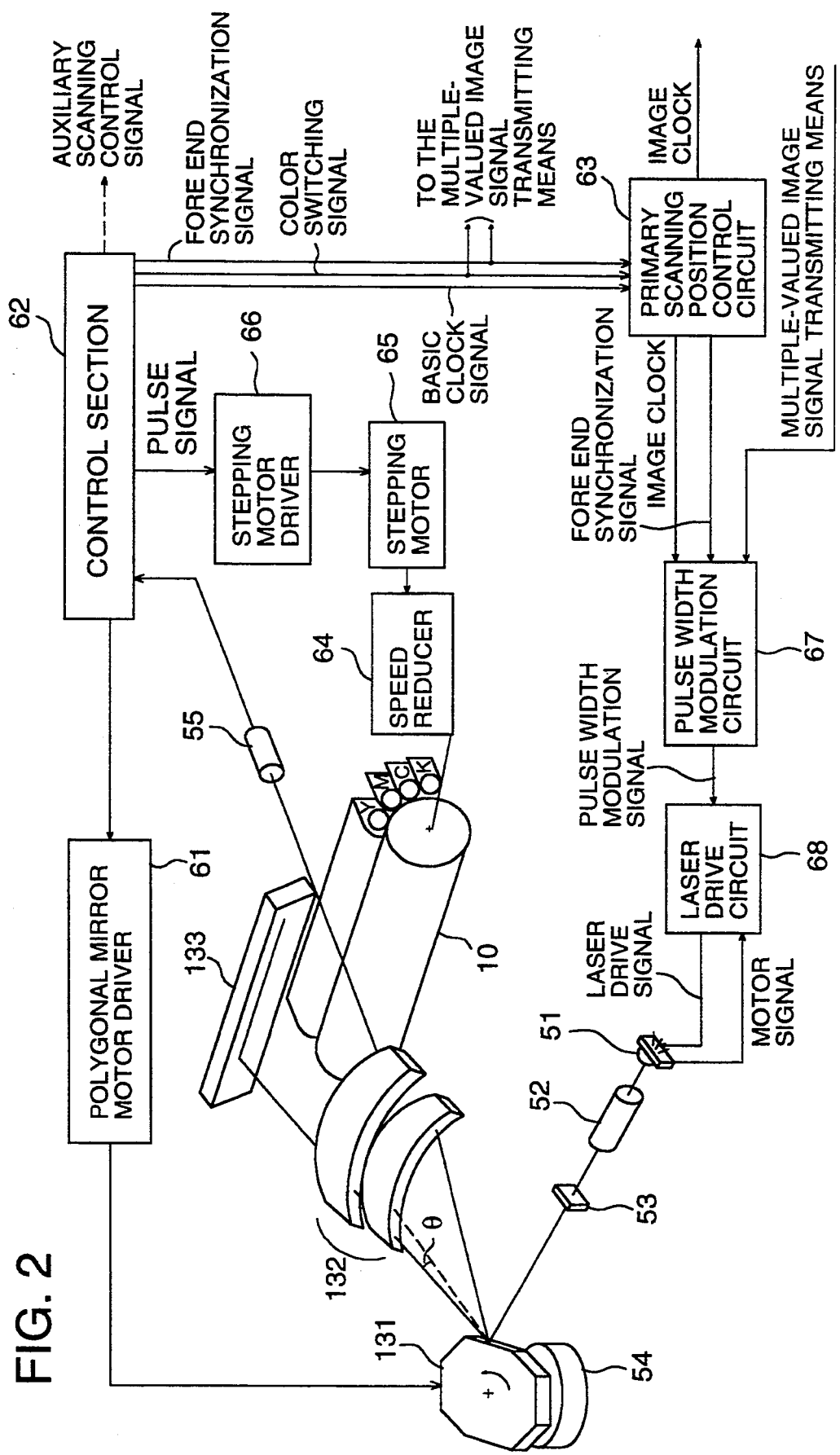
FIG. 2 is a perspective view showing an outline of the arrangement of the color laser printer.
Figure 4:
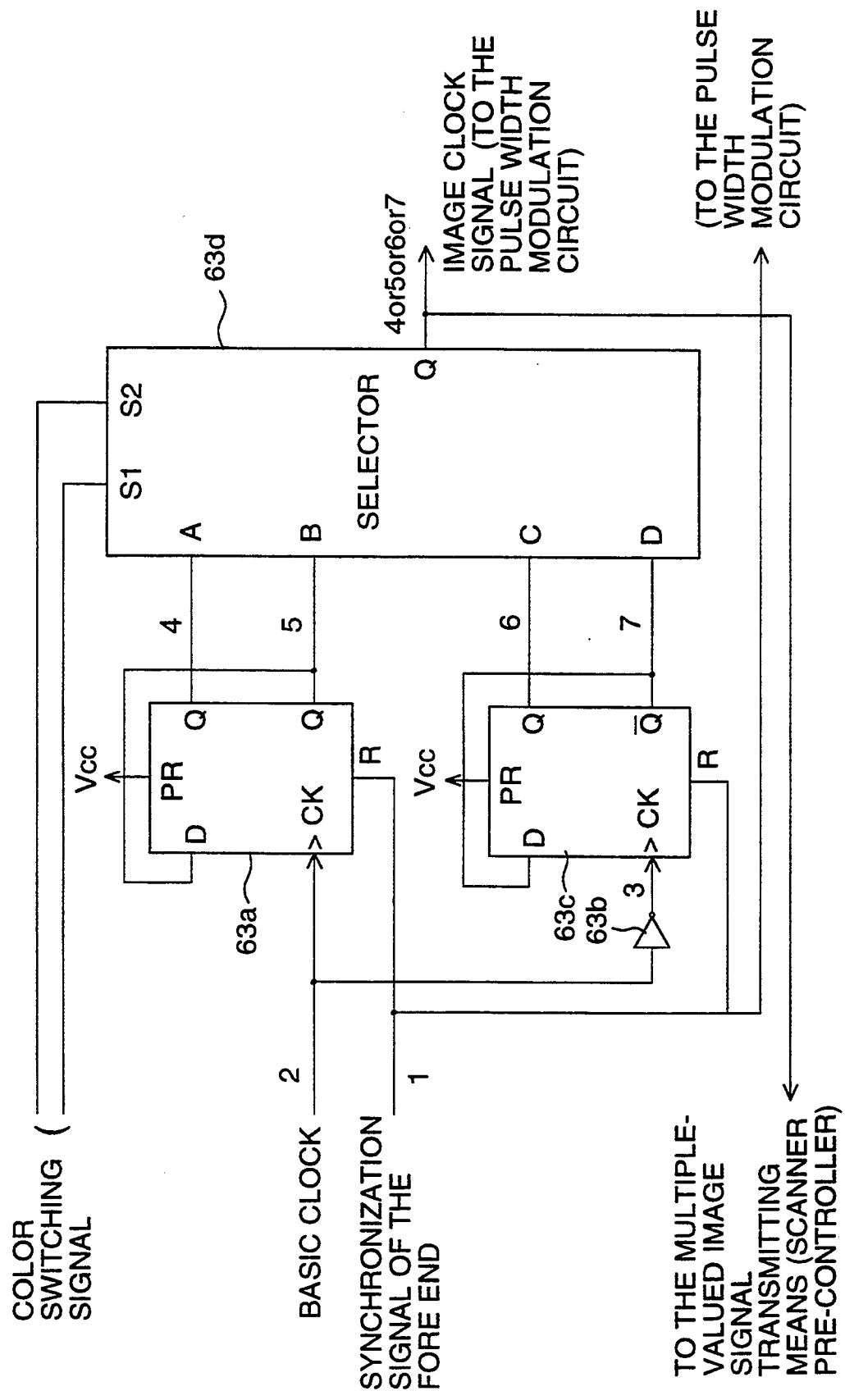
FIG. 4 is a circuit diagram showing an arrangement of the primary scanning position control circuit of the color laser printer.

FIG. 4 shows the structure of the primary scanning position control circuit 63 illustrated in FIG. 2.

Figure 7:
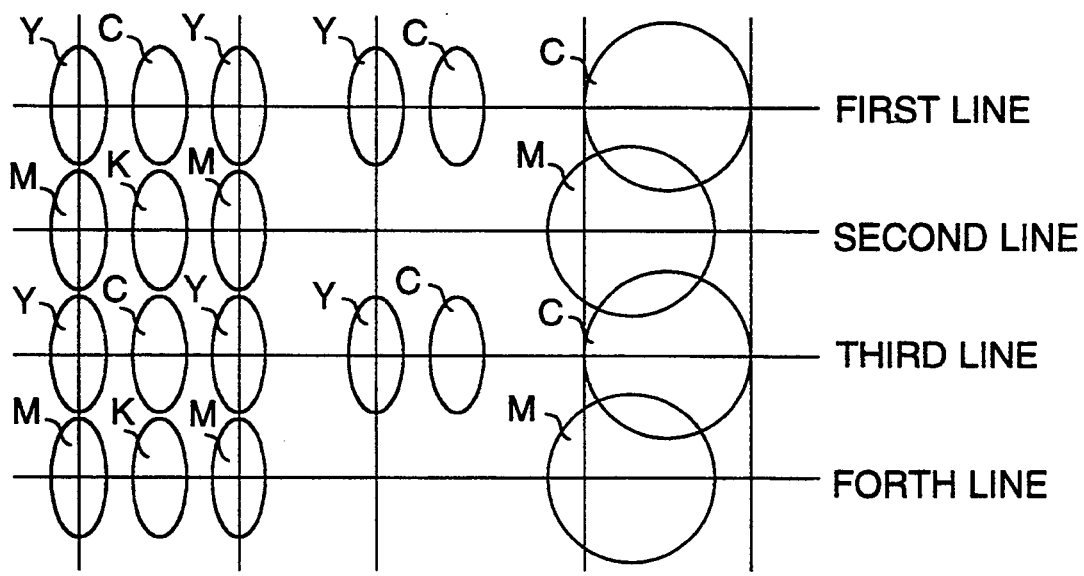
FIG. 7 is a time chart showing the condition of a toner image of each color component according to the second example of the present invention.
Figure 8:
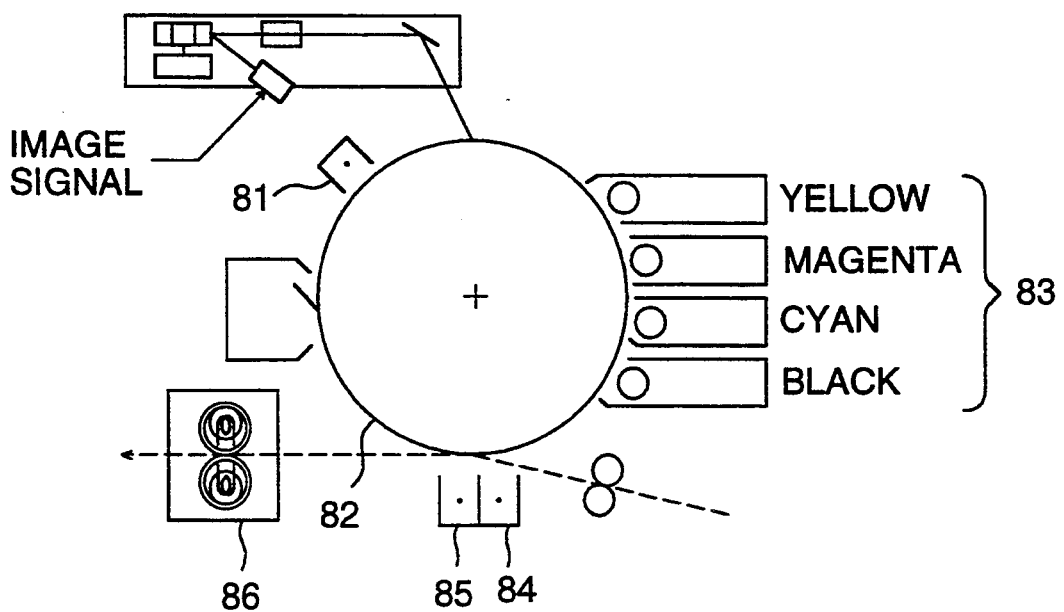
FIG. 8 is a sectional view showing an overall arrangement of a conventional color laser printer.
Figure 11:
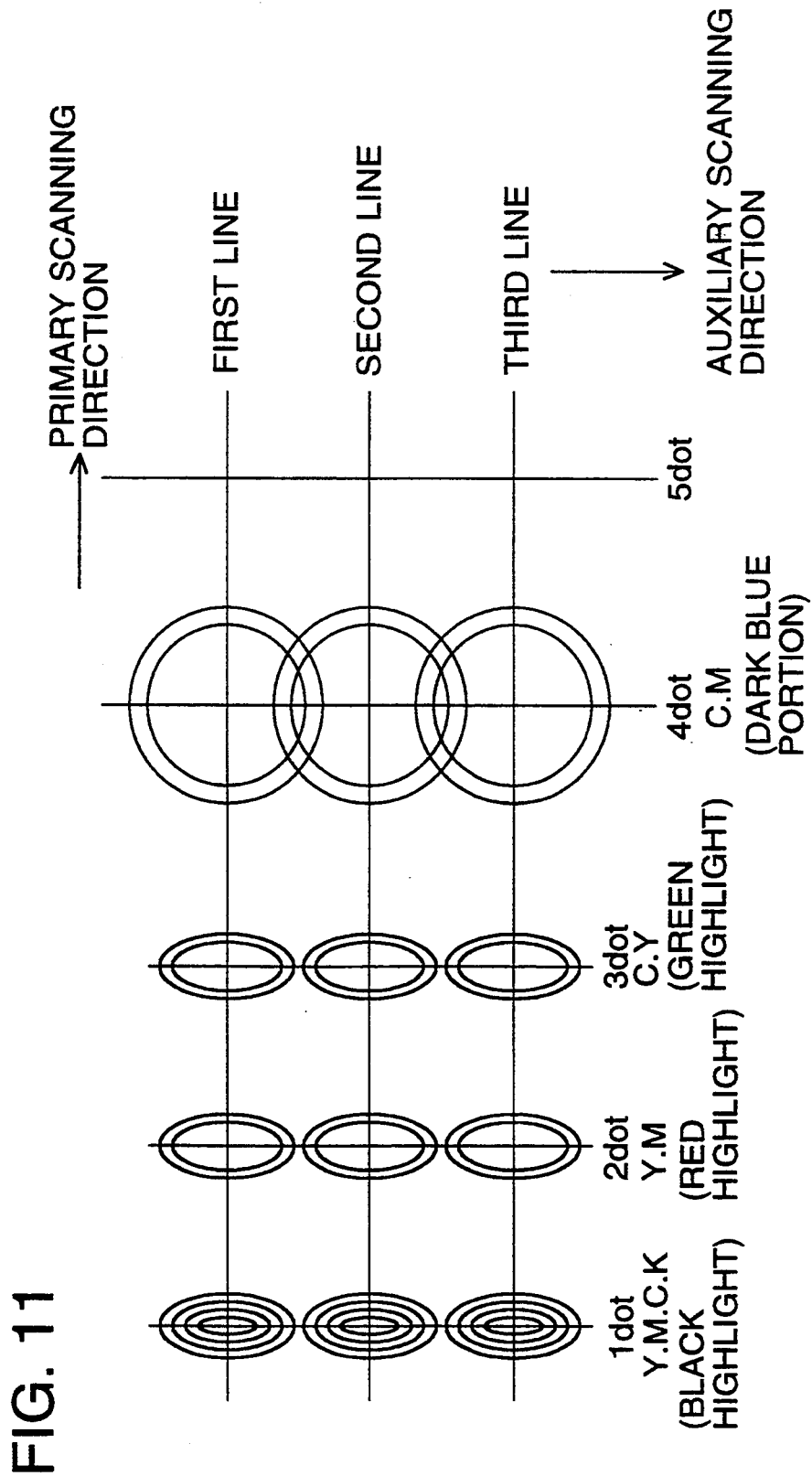
FIG. 11 is a time chart showing the condition of a toner image of each color component in the conventional color laser printer.

In synchronization with the last transition of a fore end synchronization signal, the basic clock signals are generated in the control unit 62 for each clock (shown in FIG. 6A is the fore end synchronization signal, and in FIG. 6B is the basic clock signal). As described above, the speed of this basic clock signal is twice as high as that of the image signal. The reason is that the positions are shifted by ¼ dot for each color in this example as shown in FIG. 3. However, in the case where the positions are shifted by ½ dot as shown in FIG. 7, the speed of the basic clock signal may be the same as that of the image signal. The signal is sent to the primary scanning position control circuit 63 from the control unit 62. From the control section 62, the fore end synchronization signal is also sent out, which is used for initialization of the circuit operation of the primary scanning position control circuit 63 in the line direction.

The basic clock signal is divided into two signals (the signals shown in FIGS. 6D and 6E by the D-flip-flop 63a in the primary scanning position control circuit 63. In this way, the two signals are generated. In the primary scanning position control circuit 63, a clock signal obtained when the basic clock signal is inverted by an inverter 63b is also generated, wherein the clock signal is shown in FIG. 6C. When the D flip-flops 63a, 63c are reset by the fore end synchronization signal, the same clock dividing operation can be always conducted from the last transition of the fore end synchronization signal.

The clock signals shown in FIGS. 6D through 6G divided in the aforesaid manner are inputted into the input terminals A to D of the selector circuit 63d. Then, one of the clock signals is selected in accordance with the aforesaid color switching signal, and outputted from the output terminal Q as an image clock signal.

For the purpose of concurrently inputting the color switching signals into the input terminals S1 and S2 of the selector circuit 63d, and also for the purpose of shifting the printing dot positions in alignment with Y, M, C and BK, the selector circuit 63d is constructed in the following manner: In the case of recording Y (in the case of the switching signal 00), the clock signal of FIG. 6E is selected. In the case of recording M (in the case of the switching signal 01), the clock signal of FIG. 6G is selected. In the case of recording C (in the case of the switching signal 10), the clock signal of FIG. 6D is selected. In the case of recording BK (in the case of the switching signal 11), the clock signal of FIG. 6F is selected.

The clock signals of FIGS. 6D through 6G selected in the aforesaid manner are sent as an image clock signal to the pulse width modulation circuit 67 shown in FIG. 2, or a color scanner or a printing controller not shown that transmits multiple-valued image signals to this circuit 67.

Figure 5:
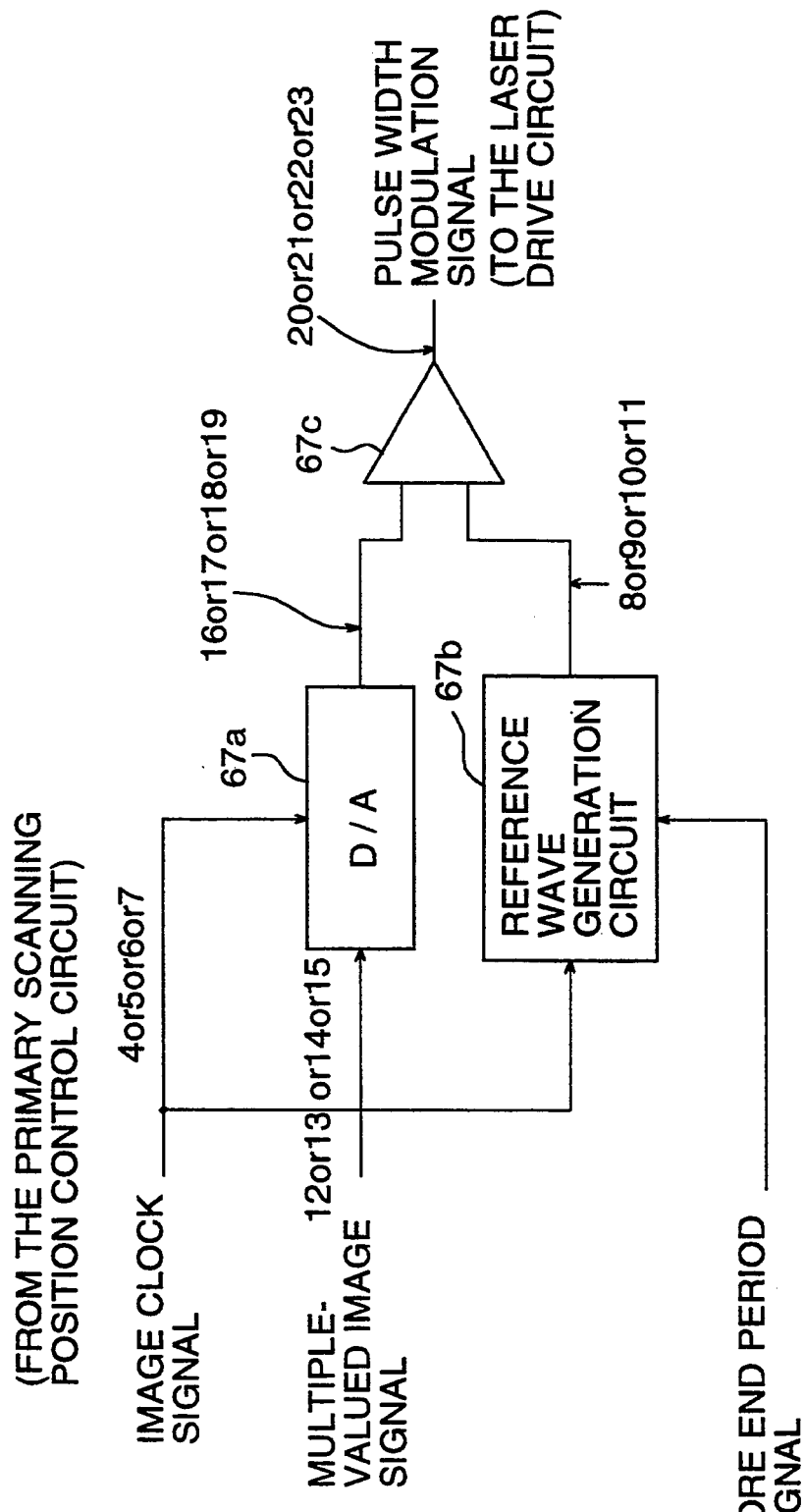
FIG. 5 is a circuit diagram showing an arrangement of the pulse width modulation circuit of the color laser printer.

FIG. 5 shows the structure of the pulse width modulation circuit 67. As shown in the drawing, the pulse width modulation circuit 67 includes a D/A converter 67a, reference wave generation circuit 67b and comparator 67c.

Image clock signals sent from the primary scanning position control circuit 63 are inputted into the D/A converter 67a and the reference wave generation circuit 67b.

The reference wave generation circuit 67b is composed of a well known reversal output type integral circuit, and the inputted image clock signal is integrated so that a triangular wave is generated in this circuit. This integrated circuit is constructed so that the generated triangular wave and the image clock signal have a relation shown in FIGS. 6D through 6K. The relation will be described as follows. When the image clock signal of FIG. 6D is inputted, the triangular wave signal of FIG. 6H is provided. When the image clock signal of FIG. 6E is inputted, the triangular wave signal of FIG. 6I is provided. When the image clock signal of FIG. 6F is inputted, the triangular wave signal of FIG. 6J is provided. When the image clock signal of FIG. 6G is inputted, the triangular wave signal of FIG. 6K is provided.

In order to stop the integral operation while the fore end synchronization signal is being inputted, the fore end synchronization signal is inputted through the primary scanning position control circuit 63. Using this signal, the integral operation of the reference wave generation circuit is stopped during the input operation of the fore end synchronization signal.

As described above, the image clock signals are supplied to the color scanner and the printing controller that output multiple-valued image signals. These apparatus are constructed to output the image signals in such a manner that they supply multiple-valued image signals in synchronization with the first transition of the image clock signals. That is, in FIG. 6L, the image signal is transmitted in synchronization with the first transition of the clock signal of FIG. 6D. In the same manner, the image signal 13 is transmitted in synchronization with the first transition of the clock signal of FIG. 6E. The image signal of FIG. 6N is transmitted in synchronization with the first transition of the clock signal of FIG. 6F. These multi-valued image signals are given to the D/A converter 67a of the pulse width modulation circuit 67 to be used as data expressing the density of each color.

The image clock signal is also supplied to the D/A converter 67a. The D/A converter 67a is constructed in such a manner that digital image data is instantaneously converted into analog data in synchronization with the last transition of the clock. Referring to the time charts, with respect to the clock signal of FIG. 6D, the image signal of FIG. 6L is provided, and the analog output of FIG. 6D converted at the last transition of the image signal of FIG. 6L is provided. In the same manner, with respect to the clock signal of FIG. 6L, the image signal of FIG. 6M is provided, and the analog output of FIG. 6Q is also provided. With respect to the clock signal of FIG. 6F, the image signal of FIG. 6N is provided, and the analog output of FIG. 6K is also provided. With respect to the clock signal of FIG. 6Q, the image signal of FIG. 6O is provided, and the analog output of FIG. 6S is also provided.

When the timed relation is controlled in the aforesaid manner, the analog image signals of FIGS. 6P through 6S are compared with the triangular signals of FIGS. 6H through 6K by the comparator 67c. As a result of the comparison, pulse width modulation signals of FIGS. 6T through 6W are provided.

For example, in the case of a Y signal, when the clock signal of FIG. 6E is selected and supplied to the pulse width modulation circuit 67, a pulse width modulation signal of FIG. 6W, the phase of which is the earliest, can be provided. In the case of a C signal, the clock signal of FIG. 6D is selected, and the secondarily earliest pulse width modulation signal of FIG. 6V is generated.

The pulse width modulation signals of FIGS. 6T through 6W generated in the aforesaid manner are sent to the laser drive circuit 68 shown in FIG. 2. In the laser drive circuit 68, a drive current to modulate laser beams in accordance with a pulse width is controlled to be turned on and off. This controlled current is used for the laser drive signal. In this drive circuit 68, a current to drive the laser unit is controlled using a well known APC circuit (automatic power control circuit) so that a predetermined optical power can be provided when the laser unit is turned on by a monitor diode signal of the semiconductor laser 51. In this way, the optical output is stabilized.

When the above construction is adopted, recording position control can be carried out, in which the writing start positions of Y, M, C and BK are successively shifted by ¼ dot, that is, the writing start positions of Y, M, C and BK are successively shifted by ¼ pixel.

When the writing start position of each image signal is shifted in the aforesaid manner, an area in which the toners of different colors are not overlapped can be sufficiently increased in the highlight (low density) region where the dot area of each pixel is small. Therefore, the potential of each latent image for depositing each toner can be ensured, and sufficient deposition strength of toner can be provided. When the density of toner is low, it becomes difficult to superimpose the toners. However, according to the present invention, when the density is low, an area in which the toners are not superimposed is increased, so that the toners can be easily deposited. In the highlight region, the line length in the primary scanning direction is approximately 10 to 20 μm. On the other hand, the resolving power of human's eyes is approximately 40 μm. Therefore, the positional slippage of each color can not be recognized by human eye, but the synthesized color can be recognized.

In a conventional system, toners are completely superimposed. Therefore, in the conventional system, when the toner of the first color is deposited in a highlight region, the latent image potential is lowered, so that the toners of the second color and after that are not stably deposited. Compared with the conventional system, the present invention provides a system in which the toner deposition amount of each color can be accurately and uniformly controlled. Consequently, color reproduction properties can be greatly improved. In this connection, in a high density region, an absolute amount of the developed area is large, which is different from the line development. Therefore, sufficient toner depositing force can be provided so that the color reproduction properties can be provided in the same manner as the conventional system.

In the examples described above, the toner of each color is shifted only in the primary scanning direction, however, the toner of each color may be shifted in the auxiliary scanning direction. An example in which the toner of each color is shifted in the primary and auxiliary scanning directions will be explained as follows. FIG. 7 shows an image formation condition of each color in this example. In the drawing, Y and C, and M and BK are respectively shifted in the primary scanning direction by ½ dot so as to be recorded. On the other hand, Y and C, and M and BK are alternatively recorded each time the auxiliary scanning is performed. With respect to the pixels, they are respectively shifted by ½ pixel in the primary and auxiliary scanning directions.

Whereas the construction of the hardware of this example is the same as that of the example described above, the same drawing is used for explanation. In this example, as shown by a dotted line in FIG. 2, the control unit 62 outputs an auxiliary scanning control signal to an image signal transmitting unit such as a color scanner and a print controller outputting multiple-valued image signals. In the construction shown in FIG. 2, the auxiliary scanning control signal is defined as a signal necessary for shifting Y and C, and M and BK in the auxiliary scanning direction. That is, the aforesaid fore end synchronization signal is counted, and in the case of an even number of lines, it is discriminated to be 1, and in the case of an odd number of lines, it is discriminated to be 0. In this way, the discrimination signals are outputted.

In an odd number of lines, Y and C may be active, and in an even number of lines, M and BK may be active. Therefore, the auxiliary scanning control signal is inputted into the image signal transmitting unit, so that the even number lines and odd number lines are discriminated. In the case of an odd number of lines, only the Y and C images are recorded in the form of dots, and the M and BK image signals are not recorded. Therefore, the image signal transmitting unit transmits data (for example, 0 0). In the same manner, in an even number of lines, only the image signals of M and BK are recorded in the form of dots, and the image signals of the Y and C images are not recorded. In the aforesaid manner, data is transmitted. In this connection, the aforesaid line discrimination may be performed immediately before the pulse width modulation circuit 67. In this case, the line discrimination is performed in the primary scanning position control circuit 63. Alternatively, a line selector is independently provided after the primary scanning position control circuit 63.

Further, in this example, the toner of each color is shifted in the primary scanning direction by ½ dot so as to be recorded. Therefore, the construction of the selector circuit 63d shown in FIG. 4 may be changed, and when the color switching signal is a Y signal (0 0), or an M signal (0 1), the clock signal 5 of FIG. 6E may be selected, and when the color switching signal is a C signal (1 0), or a BK signal (1 1), the clock signal of FIG. 6D may be selected.

As compared with the first example in which the toner of each color is shifted by ¼ pixel, in this example in which the toner of each color is shifted by ½ pixel, the resolving power is reduced to ½ since the number of the image signal data is reduced to ¼. However, in this example, the deposition of toner of each color can be more easily controlled in the highlight region. Consequently, in accordance with the request of resolving power, an appropriate direction of shift of toner of each color may be selected.

As described above, according to the present invention, the deposition of toner of each color onto the image carrier surface can be stabilized in a low density region, so that an amount of deposited toner can be accurately controlled. Therefore, the color reproduction properties can be improved.

Further, according to the present invention, when the scanning start position of an image signal of each color component is varied in a range from 1/6 to ½ pixel, the color reproduction properties in a low density region are compatible with those in a high density region in a well balanced condition.

Conventionally, in the case of a direction of auxiliary scanning, according to the grade of superimposition of the scanning lines, the potential is varied, and the toner is selectively deposited on a portion where the laser beams are overlapped. Therefore, a sharp line is formed in this portion. Even in the aforesaid case, the superimposition of beams can be avoided in a highlight portion when the toner of each color is shifted in the auxiliary direction according to the present invention. Accordingly, the image noise can be effectively reduced. If necessary, the toner of each color may be shifted in both the primary and auxiliary scanning directions.

What is claimed is:

1. A color toner image forming method comprising the steps of:
   inputting first color component image density data and second color component image density data, wherein the first color component image density data represents a density level of a first color component in a pixel and the second color component image density data represents a density level of a second color component in the pixel;
   comparing the first color component image density data with a first reference signal so as to generate a first pulse-width modulated signal that determines the size of a dot to be formed in the pixel corresponding to the density level of the first color component;
   scanning an image carrying member with a light beam modulated by the first pulse-width modulated signal so as to form a first latent dot image thereon;
   developing the first latent dot image so as to form a first toner dot image on the image carrying member;
   comparing the second color component image density data with a second reference signal so as to generate a second pulse-width modulated signal that determines the size of a dot to be formed in the pixel corresponding to the density level of the second color component;
   scanning the image carrying member with a light beam modulated by the second pulse-width modulated signal so as to form a second latent dot image on the image carrying member having the first toner dot image developed thereon; and
   developing the second latent dot image so as to form a second toner dot image on the image carrying member having the first toner dot image developed thereon;
   wherein the first reference signal and the second reference signal each have a different phase so as to prevent the first toner dot image from being superimposed over the second toner dot image when the pixel has a density level lower than a predetermined value.

2. A color toner image forming apparatus comprising:
   means for inputting a plurality of color component image density data respectively representing density levels of a plurality of color components in a pixel;
   means for comparing one of the plurality of color component image density data with a reference signal so as to generate a pulse-width modulated signal that determines the size of a dot to be formed in the pixel corresponding to the density level of respective color component;
   means for scanning an image carrying member with a light beam modulated by the pulse-width modulated signal so as to form a latent dot image thereon;
   means for developing the latent dot image so as to form a toner dot image on the image carrying member;
   means for controlling the comparing means, the scanning means and the developing means so that respective toner dot images may be developed on the image carrying member for the remaining color component image density data; and means for shifting each of the toner dot images so as to prevent the toner dot images from being superimposed over each other on the image carrying member when the pixel has a density level lower than a predetermined value.

3. The apparatus of claim 2, further comprising means for providing a plurality of reference signals, each reference signal having a phase different from the other reference signals.

4. The apparatus of claim 3, wherein the shifting means respectively selects for each of the plurality of color component image density data one reference signal from the plurality of reference signals, and the comparing means compares each of the plurality of color component image density data with the respective reference signal.

5. The apparatus of claim 2, wherein the shifting means shifts each of the toner dot images within a range of 1/6 to ½ of a given size of the pixel.

* * * * *